United States Patent
Bushey et al.

(10) Patent No.: US 12,330,377 B2
(45) Date of Patent: Jun. 17, 2025

(54) METHOD FOR FABRICATING A WRAP AROUND FURNITURE GLIDE

(71) Applicants: Richard Bushey, Kenosha, WI (US); Bret L. Bushey, Mt. Pleasant, WI (US); Dennis Bushey, East Troy, WI (US)

(72) Inventors: Richard Bushey, Kenosha, WI (US); Bret L. Bushey, Mt. Pleasant, WI (US); Dennis Bushey, East Troy, WI (US)

(*) Notice: Subject to any disclaimer, the term of this patent is extended or adjusted under 35 U.S.C. 154(b) by 145 days.

(21) Appl. No.: 18/116,096

(22) Filed: Mar. 1, 2023

(65) Prior Publication Data
US 2024/0293975 A1  Sep. 5, 2024

(51) Int. Cl.
*B29C 65/20* (2006.01)
*A47B 91/06* (2006.01)
*B29C 35/16* (2006.01)

(52) U.S. Cl.
CPC .............. *B29C 65/20* (2013.01); *A47B 91/06* (2013.01); *B29C 35/16* (2013.01); *A47B 2091/063* (2013.01)

(58) Field of Classification Search
None
See application file for complete search history.

(56) References Cited

U.S. PATENT DOCUMENTS

| | | |
|---|---|---|
| 1,112,828 A | 10/1914 | Neuberth |
| 1,230,836 A | 6/1917 | Ballenberg |
| 1,382,833 A | 6/1921 | Hurd |
| 1,383,806 A | 7/1921 | Haynes |
| 1,486,267 A | 3/1924 | Salomon |
| 1,603,876 A | 10/1926 | Shapard |
| 1,690,754 A | 11/1928 | Rosenthal |
| 1,818,211 A | 8/1931 | Duncan, Jr. |
| 1,804,841 A | 1/1932 | Pedroli |
| 1,861,095 A | 5/1932 | Schacht |
| 1,867,736 A | 7/1932 | Finkeldey |
| 1,903,609 A | 4/1933 | Uhl |
| 1,915,272 A | 6/1933 | Duncan, Jr. |
| 1,982,138 A | 11/1934 | Herold |
| 2,030,649 A | 2/1936 | Miller |
| 2,116,941 A | 5/1938 | Francis |
| 2,234,577 A | 3/1941 | Reiter |
| 2,262,063 A | 11/1941 | Swarr |
| 2,262,064 A | 11/1941 | Swarr |
| 2,633,599 A | 4/1953 | Dolan |
| 2,644,978 A | 7/1953 | Becker |
| 2,710,027 A | 6/1955 | Husgen et al. |
| 2,753,586 A | 7/1956 | Metz |
| 2,794,205 A | 6/1957 | Skupas |
| 2,820,240 A | 6/1958 | Simpson et al. |
| 2,840,113 A | 8/1958 | Thornsbury |
| 2,865,133 A | 12/1958 | Hoven et al. |

(Continued)

*Primary Examiner* — Barbara J Musser
(74) *Attorney, Agent, or Firm* — Boyle Fredrickson, S.C.

(57) ABSTRACT

A method of fabricating a furniture glide is provided. The method includes the step of providing a furniture engaging layer having first and second surfaces. A slide is positioned adjacent to the second surface of the furniture engaging layer. The slide is fabricated from a meltable material. The slide is heated so as to cause a portion of the meltable material to melt and flow into the furniture engaging layer. Solidification of the portion of meltable material in the furniture engaging layer bonds the slide to the furniture engaging layer.

20 Claims, 4 Drawing Sheets

(56) References Cited

U.S. PATENT DOCUMENTS

| | | |
|---|---|---|
| 2,875,552 A | 3/1959 | Stillman |
| 2,878,509 A | 3/1959 | Fisher |
| 2,888,775 A | 6/1959 | Thoeming |
| 2,902,794 A | 9/1959 | Ehrgott |
| 2,904,294 A | 9/1959 | Marygold |
| 2,933,754 A | 4/1960 | Winans |
| 2,954,636 A | 10/1960 | Gammache |
| 2,968,116 A | 1/1961 | Arenson |
| 2,974,352 A | 3/1961 | Lockwood |
| 2,988,770 A | 6/1961 | Arenson |
| 2,992,509 A | 7/1961 | Gaenzle |
| 3,059,267 A | 10/1962 | Wilhelmi |
| 3,078,498 A | 2/1963 | Morgan |
| 3,177,518 A | 4/1965 | Bergstrom |
| 3,183,545 A | 5/1965 | Bergstrom |
| 3,191,212 A | 6/1965 | Reiss, Sr. et al. |
| 3,254,362 A | 6/1966 | Rasor et al. |
| 3,342,445 A | 9/1967 | Bouwkamp |
| 3,353,231 A | 11/1967 | Levine |
| 3,389,421 A | 6/1968 | Wheeler |
| 3,505,724 A | 4/1970 | Leitner et al. |
| 3,620,896 A | 11/1971 | Glasgow |
| 3,634,925 A | 1/1972 | Van Loo |
| 3,640,496 A | 2/1972 | Duncan |
| 3,845,924 A | 11/1974 | Taviere et al. |
| 3,883,923 A | 5/1975 | England |
| 4,327,460 A | 5/1982 | Wolff |
| 4,468,910 A | 9/1984 | Morrison |
| D276,606 S | 12/1984 | Neuwirth |
| 4,576,357 A | 3/1986 | Schrepfer |
| 4,654,245 A | 3/1987 | Balzer et al. |
| 5,005,374 A | 4/1991 | Spitler |
| 5,010,621 A | 4/1991 | Bock |
| 5,042,764 A | 8/1991 | Carpinella et al. |
| 5,057,356 A | 10/1991 | Smith |
| 5,081,740 A | 1/1992 | Smith |
| 5,094,416 A | 3/1992 | Huon |
| 5,160,105 A | 11/1992 | Miller |
| 5,170,972 A | 12/1992 | Guell |
| 5,220,705 A | 6/1993 | Bushey |
| D339,560 S | 9/1993 | Byrd |
| D348,985 S | 7/1994 | Walker |
| 5,330,814 A | 7/1994 | Fewell |
| D353,505 S | 12/1994 | Rea |
| 5,426,818 A | 6/1995 | Bushey |
| 5,469,599 A | 11/1995 | Wurdack |
| 5,513,900 A | 5/1996 | Iglesias |
| 5,557,824 A | 9/1996 | Bushey |
| 5,573,212 A | 11/1996 | Palazzolo |
| 5,573,213 A | 11/1996 | Henderson et al. |
| D376,944 S | 12/1996 | Dunn |
| 5,591,974 A | 1/1997 | Troyer et al. |
| 5,603,140 A | 2/1997 | Pryce |
| D381,865 S | 8/1997 | Gallagher |
| 5,680,673 A | 10/1997 | Beshore |
| 5,782,444 A | 7/1998 | Anderman et al. |
| 5,802,669 A | 9/1998 | Wurdack |
| D400,088 S | 10/1998 | Hurrie |
| 5,834,081 A * | 11/1998 | Fanti ................. B29C 65/02 156/304.6 |
| 5,898,975 A | 5/1999 | Hancock |
| 5,946,737 A | 9/1999 | Fleege |
| D415,672 S | 10/1999 | Students et al. |
| 6,088,877 A | 7/2000 | Swy et al. |
| 6,154,923 A | 12/2000 | Carpinella |
| 6,280,817 B1 | 8/2001 | McCrossin et al. |
| 6,324,725 B1 | 12/2001 | Green |
| 6,353,951 B1 | 3/2002 | Gramling |
| D455,383 S | 4/2002 | Sneed |
| 6,647,589 B1 | 11/2003 | Youngwith |
| 6,695,939 B1 * | 2/2004 | Nakamura .......... B32B 37/04 156/309.9 |
| 6,855,651 B2 | 2/2005 | Yu |
| 7,237,302 B2 | 7/2007 | Bushey |
| 8,234,751 B2 | 8/2012 | Bushey et al. |
| 8,438,701 B2 | 5/2013 | Bushey |
| 8,726,463 B2 | 5/2014 | Bushey et al. |
| 2005/0183234 A1 | 8/2005 | Bushey et al. |
| 2008/0040889 A1 | 2/2008 | Edwards |
| 2010/0018005 A1 | 1/2010 | Bushey |

\* cited by examiner

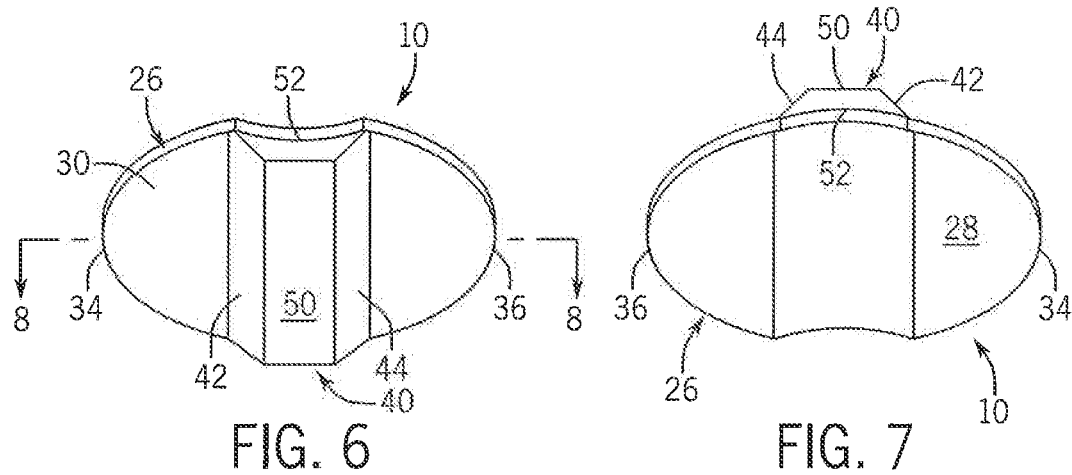
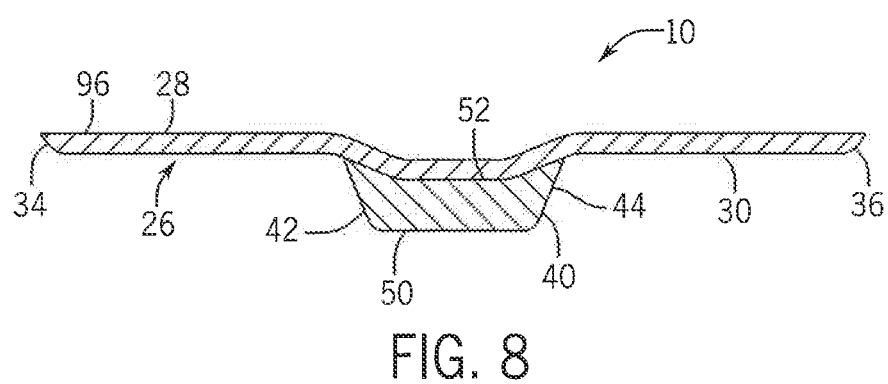

METHOD FOR FABRICATING A WRAP AROUND FURNITURE GLIDE

FIELD OF THE INVENTION

This invention relates generally to furniture glides, and in particular, to a method of fabricating a furniture glide for mounting to a base portion of a tubular chair frame or a foot mounted to the terminal end of a leg of a piece of furniture which is more durable than prior furniture glides.

BACKGROUND AND SUMMARY OF THE INVENTION

Coasters are often used under the legs of a piece of furniture to act as a buffer between the legs and the floor on which the piece of furniture rests. Typically, coasters take the form of glass or rubber discs having flat bottoms that rest on the floor. By positioning the coasters between the furniture legs and the floor, the weight of the furniture leg is dispersed over a larger area such that the furniture leg does not scratch or mar the floor when the piece of furniture is moved or leave a depression in the floor when the piece of furniture remains in one place for an extended period of time.

While functional for their intended purpose, these prior art furniture glides have certain limitations. More specifically, these prior furniture glides are designed for mounting onto the bottoms of pieces of furniture or on the legs thereof. As a result, the furniture glides do not fit properly on pieces of furniture that are fabricated using tubular frames, such as office chairs and the like. Further, repeated movement of a piece of furniture along a floor may cause the furniture glide to become detached from the bottom of the piece of furniture. As a result, the furniture glide may become separated from the piece of furniture such that the bottom of the piece of furniture may engage and damage the flooring.

In order to cover these deficiencies, furniture glides have been developed which are intended to be securely retained on a tubular frame of a piece of furniture. By way of example, Bushey, U.S. Pat. No. 7,237,302 discloses a furniture glide having an inner surface for engaging a bottom of a tubular leg of a piece of furniture and an outer surface for engaging a supporting surface. First and second sidewalls project from opposite sides of the base and have inner surfaces for engaging opposite sides of the leg of the piece of furniture. Each sidewall is pivotable between a first storage position wherein the sidewall is spaced from a corresponding side of the leg and a second operating position wherein the sidewall is in engagement with the corresponding side of the leg. It is noted that the furniture glide disclosed in the '302 patent incorporates slits in the sidewalls thereof to facilitate the wrapping of the sidewalls of the furniture glide about the outer periphery of a tubular leg of a piece of furniture. These slits, in turn, increase the production cost of the furniture glide. In addition, given the slits in the sidewalls and the thin felt material from which the furniture glide is fabricated, the durability of the furniture glide disclosed in the '302 patent can be somewhat limited.

Various attempts have been made to address the durability concerns associated with these types furniture glides. By way of example, Bushey et al., U.S. Pat. No. 8,726,463 discloses a multi-layer furniture glide configured to wrap around a base portion of a chair frame is disclosed. More specifically, the furniture glide in the '463 patent includes a flexible first layer configured to engage a chair frame. A second layer, bonded to the first layer, is cushioned. A third layer is configured to engage the floor and is made of a durable material to handle the wear associated with engaging the floor. Side portions of the first layer wrap around the base portion of the chair to easily attach the furniture glide to the chair.

While functional for their intended purpose, these prior art furniture glides have certain limitations when the furniture glides are mounted to pieces of furniture which are intended to used outside or on supporting surfaces fabricated from abrasive materials such as concrete or brick. It can be appreciated that repeated movement of a piece of furniture over an abrasive supporting surface may cause the furniture glide to become detached from the bottom of the piece of furniture or, in the case of the furniture glide in the '4363 patent, to cause the layers of the furniture glide to separate. As a result, the bottom of the piece of furniture may engage the supporting surface and become damaged.

Therefore, it is a primary object and feature of the present invention to provide method of fabricating a furniture glide that is more durable than prior furniture glide.

It is a further object and feature of the present invention to provide method of fabricating a furniture glide that is inexpensive and simple.

It is a still further object and feature of the present invention to provide a method of fabricating a furniture glide In accordance with the present invention, a method of fabricating a furniture glide is provided. The method includes the steps of providing a furniture engaging layer having first and second surfaces and positioning a slide adjacent to the second surface of the furniture engaging layer. The slide is fabricated from a meltable material. The slide is heated so as to cause a portion of the meltable material to melt and flow into the furniture engaging layer. Solidification of the portion of meltable material in the furniture engaging layer bonds the slide to the furniture engaging layer.

The step of heating the slide may include the additional step of positioning a surface of a heating element adjacent to the first surface of the furniture engaging layer. The surface of the heated element in alignment with the first side of the slide. The surface of the heated element is brought into contact with the furniture engaging layer so as to heat to the portion of the meltable material of the slide. The heating element may be a bar having a convex outer surface engageable with the first surface of the furniture engaging layer. The bar may be used to form a concave recess in the first side of the slide. The slide may be fabricated from a high-density polyethylene. The portion of meltable material in the furniture engaging layer may be cooled to facilitate the solidification thereof, e.g., by contacting the furniture engaging layer with a cooling bar.

In accordance with a further aspect of the present invention, a method of fabricating a furniture glide is provided. The method includes the step of providing a furniture engaging layer having first and second surfaces, first and second ends, and first and second sides. A slide is positioned against the second surface of the furniture engaging layer. The slide extends from the first side of the furniture engaging layer to the second side of the furniture engaging layer and is fabricated from a meltable material. The first surface of the furniture engaging layer is engaged with a heating element so as to cause a portion of the slide to melt and flow into the furniture engaging layer. The portion of meltable material in the furniture engaging layer is solidified to bond the slide to the furniture engaging layer.

The heating element may take the form of a bar having a convex outer surface engageable with the first surface of the furniture engaging layer. A concave recess is formed in the slide in response to the heating of the slide with the heating element. A concave recess may also be formed in first surface of the furniture engaging letter. It is contemplated for the slide to be fabricated from a high-density polyethylene. The step of solidifying the portion of meltable material includes the additional step of cooling the portion of meltable material in the furniture engaging layer. The portion of meltable material may be cooled by contacting the furniture engaging layer with a cooling bar.

In accordance with a still further aspect of the present invention, a method of fabricating a furniture glide is provided. The method includes the steps of providing a furniture engaging layer having first and second surfaces and positioning a meltable slide against the second surface of the furniture engaging layer. A portion of the slide is melted and flows into the furniture engaging layer. The portion of the slide in the furniture engaging layer is solidified to bond the slide to the furniture engaging layer.

A heating element may be positioned against the first surface of the furniture engaging layer to melt the slide. A concave recess may be formed in a first side of the slide and in the first surface of the furniture engaging letter. It is contemplated for the slide to be fabricated from a high-density polyethylene. The step of solidifying the portion of slide may include the additional step of cooling the furniture engaging layer, e.g., by contacting the furniture engaging layer with a cooling bar.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 6 is a bottom, isometric view showing a furniture glide fabricated in accordance with the methodology of present invention;

FIG. 7 is a top, isometric view showing the furniture glide of FIG. 6; and

FIG. 8 is a cross sectional view of the furniture glide fabricated in accordance with the methodology of present invention taken along line 8-8 of FIG. 6.

DETAILED DESCRIPTION OF THE DRAWINGS

Figure 1:
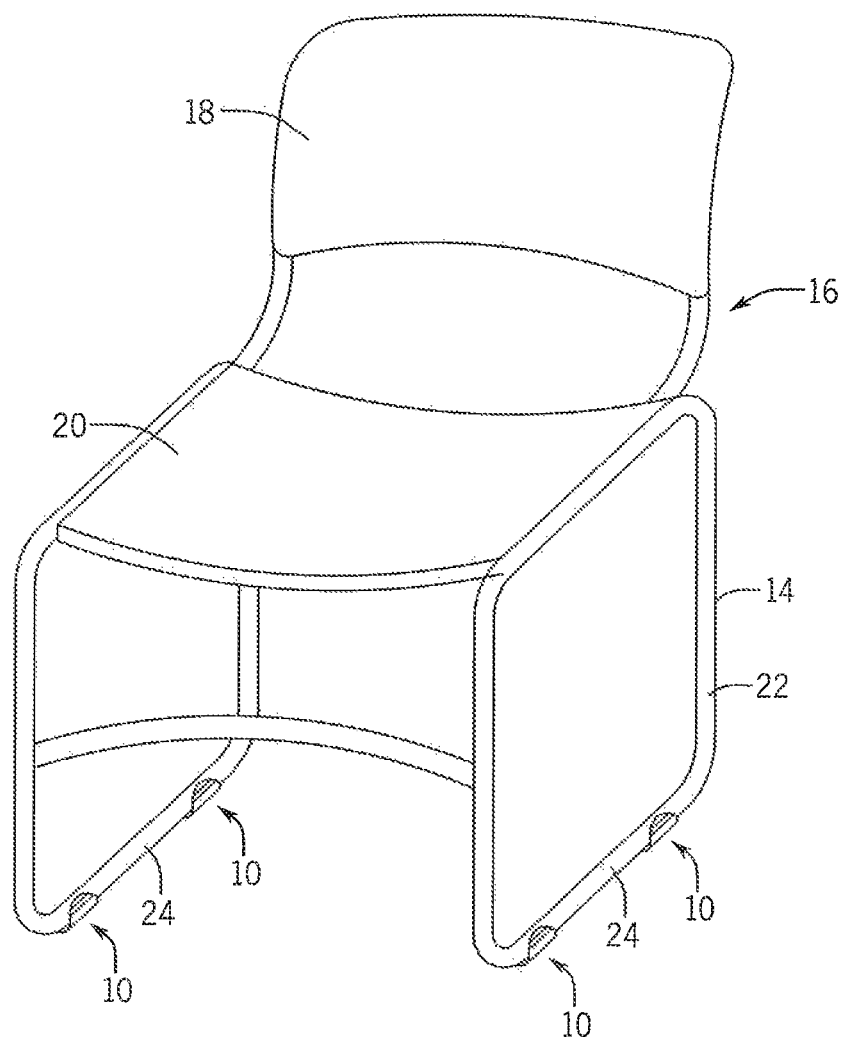
FIG. 1 is an isometric view of a chair incorporating a plurality of furniture glides mounted thereto, the furniture glides fabricated in accordance with the methodology of present invention.
Figure 2:
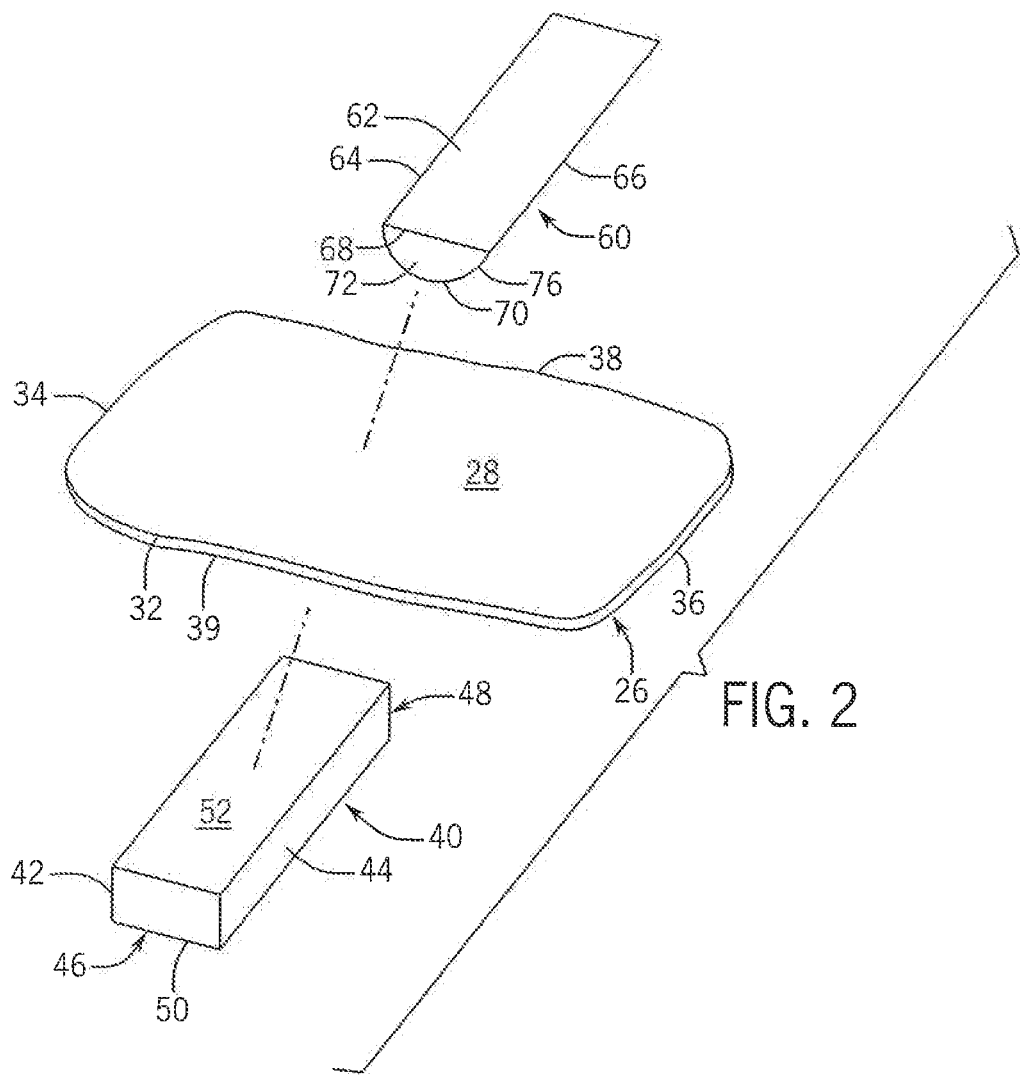
FIG. 2 is an exploded isometric view showing an initial step in the fabrication of a furniture glide in accordance with the methodology of present invention.

Referring to FIG. 1, a furniture glide fabricated in accordance with the methodology of the present invention is generally designated by the reference numeral 10. It is intended that furniture glide 10 be receivable on a base portion 14 of a conventional chair 16 or similar piece of furniture. According to an exemplary application, the chair 16 includes back 18 and seat 20 interconnected by a tubular frame 22. The tubular frame 22 includes two, generally parallel, horizontal base portions 24 which are intended to support chair 16 on a supporting surface such as a floor or the like.

Referring to FIGS. 2-3 and 6-8, furniture glide 10 included a furniture engaging layer 26 having a generally oblong shape and including first and second surfaces 28 and 30, respectively, interconnected by an outer periphery 32. Outer periphery 32 of furniture engaging layer 26 defines first and second ends 34 and 36, respectively, and first and second sides 38 and 39, respectively. It is noted that furniture engaging layer 26 may have other configurations without deviating from the scope of the present invention. For reasons hereinafter described, it is intended for furniture engaging layer 26 to be fabricated from a fibrous, matted material which is flexible, such as a polyester fabric or felt. However, it can be understood that furniture engaging layer 26 may be constructed out of other types of flexible, porous materials without deviating from the scope of the present invention.

Furniture glide 10 further includes a generally rectangular floor engaging element or slide 40. Slide 40 is defined by first and second sides 42 and 44, respectively, first and second ends 46 and 48, respectively, a generally flat floor engaging surface 50 and a layer engaging surface 52. Layer engaging surface 52 may be generally flat or concave, for reasons hereinafter described. Preferably, slide 40 is fabricated from a thermoplastic polymer having a high-impact resistance which resists damage when in contact with or when being slid along a supporting surface fabricated from an abrasive material, such as concrete or brick and having a melting point less than the melting point of furniture engaging layer 26. For example, slide 40 may be fabricated from High Density Polyethylene (hereinafter referred to as "HDPE"). However, it can be understood that slide 40 may be fabricated out of other types of materials without deviating from the scope of the present invention.

In order to construct furniture glide 10, heating element 60 is provided. In the depicted embodiment, heating element 60 is an elongated bar extending along an axis and having a semi-circular configuration. More specifically, heating element 60 includes a generally flat upper surface 62 defined by first and second sides 64 and 66, respectively, and a terminal edge 68; acuate heating surface 70 extending between first and second sides 64 and 66, respectively, of upper surface 62; and end surface 72. Heating surface 70 has a generally convex configuration and corresponds in shape to horizontal base portions 24 of tubular frame 22 of chair 16, for reasons hereinafter described. End surface 72 has a semi-circular configuration and intersects terminal edge 68 of upper surface 62, as well as, arcuate terminal edge 76 of heating surface 70.

Figure 3:
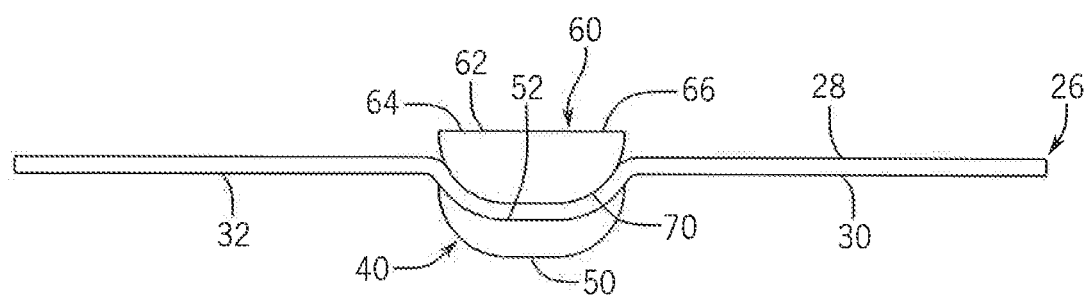
FIG. 3 is an exploded isometric view showing a subsequent step in the fabrication a furniture glide in accordance with the methodology of present invention.

To bond furniture engaging layer 26 to slide 40, heating element is heated to a predetermined temperature such that heating surface 70 is of a sufficient temperature to melt slide 40, but below the melting point of furniture engaging layer 26. As best seen in FIG. 3, slide 40 is positioned furniture engaging layer 26 such that: 1) layer engaging surface 52 of slide 40 engages second surface 30 of furniture engaging layer 26; 2) slide 40 is equidistantly disposed between first and second ends 34 and 36, respectively, of outer periphery 32 of furniture engaging layer 26; 3) first end 46 of slide 40 is aligned with first side 38 of furniture engaging layer 26;

and 4) second end 48 of slide 40 is aligned with second side 40 of furniture engaging layer 26. With slide 40 positioned as described, heating element 60 is brought into contact with and urged against furniture engaging layer 26 such that heating surface 70 engages first surface 28 of furniture engaging layer 26.

With heating surface 70 pressed against first surface 28 of furniture engaging layer 26, heating element 60 causes the portion of the thermoplastic polymer defining layer engaging surface 52 of slide 40 to melt such that: 1) the melted portion of the thermoplastic polymer flows into the fibrous, matted material forming furniture engaging layer 26; and 2) layer engaging surface 52 of slide 40 and furniture engaging layer 26 develop a semi-circular configuration corresponding in size and shape with heating surface 70 of heating element 60.

Once the thermoplastic polymer flows into the fibrous, matted material forming furniture engaging layer 26, heating element 60 is removed from into contact with furniture engaging layer 26 such that heating surface 70 no longer engages first surface 28 of furniture engaging layer 26, thereby allowing the thermoplastic polymer which flowed into the fibrous, matted material forming furniture engaging layer 26 to cool and solidify. Once the thermoplastic polymer solidifies, a mechanical bond is formed between slide 40 and furniture engaging layer 26.

Figure 4:
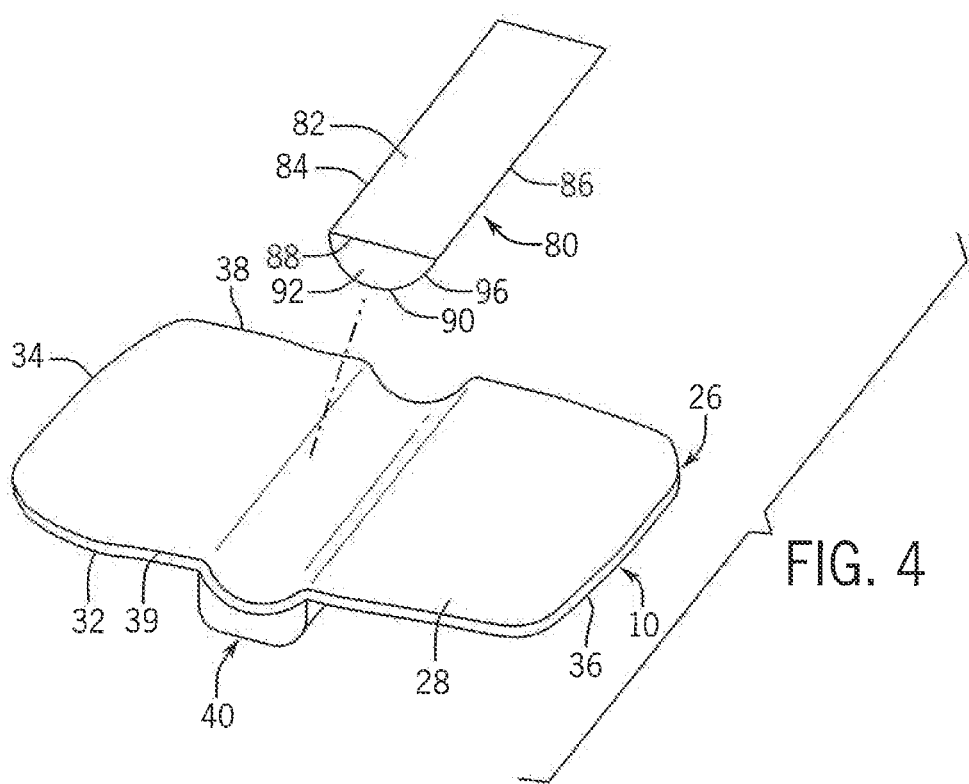
FIG. 4 is an exploded isometric view showing an additional subsequent step in the fabrication of furniture glide in accordance with the methodology of present invention.
Figure 5:
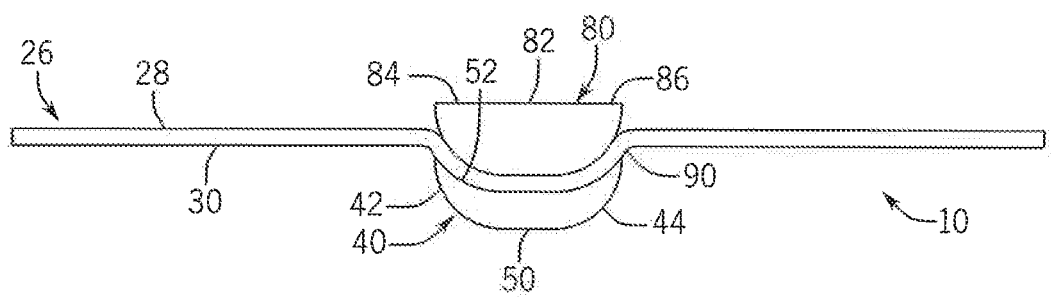
FIG. 5 is an exploded isometric view showing an additional subsequent step in the fabrication of a furniture glide in accordance with the methodology of present invention.

Referring to FIGS. 4-5, to sped up the bonding process, it is contemplated to provide cooling element 80. In the depicted embodiment, cooling element 80 is an elongated bar extending along an axis and having a semi-circular configuration. More specifically, cooling element 80 includes a generally flat upper surface 82 defined by first and second side edges 84 and 86, respectively, and a terminal edge 88 extending between first and second side edges 84 and 86, respectively; acuate cooling surface 90 extending between first and second side edges 84 and 86, respectively, of upper surface 82; and end surface 92. Cooling surface 90 has a generally convex configuration and corresponds in shape to horizontal base portions 24 of tubular frame 22 of chair 16, for reasons hereinafter described. End surface 92 has a semi-circular configuration and intersects terminal edge 88 of upper surface 82, as well as, arcuate terminal edge 96 of cooling surface 90.

To speed up solidification of the thermoplastic polymer, cooling element 80 is chilled to a desired temperature such that cooling surface 90 is of a temperature to solidify the thermoplastic polymer received in the fibrous, matted material forming furniture engaging layer 26. More specifically, cooling element 80 is brought into contact with and urged against furniture engaging layer 26 such that cooling surface 90 engages first surface 28 of furniture engaging layer 26, FIG. 5. With cooling surface 90 pressed against first surface 28 of furniture engaging layer 26, cooling element 80 causes the melted portion of the thermoplastic polymer which is received in the fibrous, matted material forming furniture engaging layer 26 to rapidly cool and solidify, thereby forming the mechanical bond between slide 40 and furniture engaging layer 26.

In order to interconnect furniture glide 10 to base portions 24 of tubular frame 22 of chair 16, furniture glide 10 is positioned adjacent a corresponding base portion 24 of chair frame 16 such that first surface 28 of furniture engaging layer 26 of furniture glide 10 is directed towards the outer periphery of the corresponding base portion 24 of chair frame 16 and such that the floor engaging surface 50 of slide 40 of furniture glide 10 is directed away from chair frame 16. It can be appreciated that the semi-circular configuration of furniture engaging layer 26 allows for first surface 28 of furniture engaging layer 26 of furniture glide 10 to form a mating relationship with the outer periphery of the corresponding base portion 24 tubular frame 22 of chair 16. First and second ends 34 and 36, respectively, of furniture glide 10 are wrapped around the outer periphery of the corresponding base portion 24 of tubular frame 22 of chair 16 such that the first surface 28 of furniture engaging layer 26 of furniture glide 10 is wrapped around the outer periphery of the corresponding base portion 24 of tubular frame 22 of chair 16, FIG. 1. Adhesive 96, such as a pressure sensitive adhesive (PSA), may be provided along on first surface 28 of furniture engaging layer 26 of furniture glide 10 to retain furniture glide 10 on the corresponding base portion 24 of tubular frame 22 of chair 16, FIG. 8. The process may be repeated multiple times in order to mount additional furniture glides 10 on the corresponding base portion 24 of tubular frame 22 of chair 16.

Various modes of carrying out the invention are contemplated as being within the scope of the following claims particularly pointing out and distinctly claiming the subject matter which is regarded as the invention.

We claim:

1. A method of fabricating a furniture glide, comprising the steps of:
   providing a furniture engaging layer having first and second surfaces;
   positioning a slide adjacent to the second surface of the furniture engaging layer, the slide fabricated from a meltable material and having a configuration; and
   heating the slide with a heating element so as to cause a portion of the meltable material to melt and flow into the furniture engaging layer;
   wherein:
   the configuration of the slide changes in response to the heating of the slide such that a recess is formed in the slide which corresponds in shape to a surface of the heating element; and
   solidification of the portion of meltable material in the furniture engaging layer bonds the slide to the furniture engaging layer.

2. The method of claim 1 wherein the step of heating the slide includes the additional steps of:
   positioning the surface of the heating element adjacent to the first surface of the furniture engaging layer, the surface of the heating element in alignment with the first side of the slide; and
   bringing the surface of the heating element into contact with the furniture engaging layer so as to heat the portion of the meltable material of the slide.

3. The method of claim 2 wherein the heating element is a bar having a convex outer surface engageable with the first surface of the furniture engaging layer.

4. The method of claim 1 comprising the additional step of forming a concave recess in the first side of the slide.

5. The method of claim 1 wherein the slide is fabricated from a high-density polyethylene.

6. The method of claim 1 comprising the additional step of cooling the portion of meltable material in the furniture engaging layer to facilitate the solidification thereof.

7. The method of claim 6 wherein the step of cooling the portion of meltable material including the step of contacting the furniture engaging layer with a cooling bar.

8. A method of fabricating a furniture glide, comprising the steps of:

providing a furniture engaging layer having first and second surfaces, first and second ends, and first and second sides;

positioning a slide against the second surface of the furniture engaging layer, the slide extending from the first side of the furniture engaging layer to the second side of the furniture engaging layer and being fabricated from a meltable material;

engaging the first surface of the furniture engaging layer with a heating element so as to cause a portion of the slide to melt and flow into the furniture engaging layer; and solidifying the portion of meltable material in the furniture engaging layer to bond the slide to the furniture engaging layer;

wherein a concave recess is formed in the slide in response to the heating of the slide with the heating element.

9. The method of claim 8 wherein the heating element is a bar having a convex outer surface engageable with the first surface of the furniture engaging layer.

10. The method of claim 8 comprising the additional step of forming a concave recess in first surface of the furniture engaging layer.

11. The method of claim 8 wherein the slide is fabricated from a high-density polyethylene.

12. The method of claim 8 wherein the step of solidifying the portion of meltable material includes the additional step of cooling the portion of meltable material in the furniture engaging layer.

13. The method of claim 12 wherein the step of cooling the portion of meltable material includes the step of contacting the furniture engaging layer with a cooling bar.

14. A method of fabricating a furniture glide, comprising the steps of:

providing a furniture engaging layer having first and second surfaces;

positioning a meltable slide against the second surface of the furniture engaging layer;

melting a portion of the slide with a heating element such that a shape of the slide changes and corresponds to a surface of the heating element, the portion flowing into the furniture engaging layer; and solidifying the portion of the slide in the furniture engaging layer to bond the slide to the furniture engaging layer.

15. The method of claim 14 comprising the additional step of positioning the heating element against the first surface of the furniture engaging layer to melt the slide.

16. The method of claim 14 comprising the additional step of forming a concave recess in a first side of the slide.

17. The method of claim 14 comprising the additional step of forming a concave recess in first surface of the furniture engaging layer.

18. The method of claim 14 wherein the slide is fabricated from a high-density polyethylene.

19. The method of claim 14 wherein the step of solidifying the portion of the slide includes the additional step of cooling the furniture engaging layer.

20. The method of claim 12 wherein the step of cooling the portion of slide the includes the step of contacting the furniture engaging layer with a cooling bar.

* * * * *